US009487227B2

(12) United States Patent
Heitz et al.

(10) Patent No.: US 9,487,227 B2
(45) Date of Patent: Nov. 8, 2016

(54) STEERING COLUMN PRODUCED FROM FIBRE-COMPOSITE AND ON THE BASIS OF PULTRUSION, BRAIDING AND/OR WINDING TECHNOLOGY

(71) Applicant: THYSSENKRUPP PRESTA AG, Eschen (LI)

(72) Inventors: Thomas Heitz, Mauren (LI); Sebastian Regner, Rebstein (CH); Arne Schacht, Feldkirch (AT); Daniel Kreutz, Feldkirch (AT)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/764,305

(22) PCT Filed: Oct. 15, 2013

(86) PCT No.: PCT/EP2013/071508
§ 371 (c)(1),
(2) Date: Jul. 29, 2015

(87) PCT Pub. No.: WO2014/117876
PCT Pub. Date: Aug. 7, 2014

(65) Prior Publication Data
US 2015/0367876 A1  Dec. 24, 2015

(30) Foreign Application Priority Data

Jan. 29, 2013 (DE) .......................... 10 2013 001 442

(51) Int. Cl.
*B62D 1/16* (2006.01)
*B29C 70/52* (2006.01)
(Continued)

(52) U.S. Cl.
CPC ............... *B62D 1/16* (2013.01); *B29C 70/083* (2013.01); *B29C 70/52* (2013.01); *B29D 23/001* (2013.01); *B29K 2105/0827* (2013.01); *B62D 1/163* (2013.01); *Y10T 29/49828* (2015.01)

(58) Field of Classification Search
CPC ....................................................... B62D 1/163
See application file for complete search history.

(56) References Cited

U.S. PATENT DOCUMENTS 4,589,679 A * 5/1986 Wackerle ............... B62D 1/192
280/777
5,028,357 A * 7/1991 Bardo ....................... F28C 1/00
261/111

(Continued)

FOREIGN PATENT DOCUMENTS

DE  19809264 A1  9/1999
DE  10242527 A1  4/2003
(Continued)

OTHER PUBLICATIONS

German language International Search Report for International patent application No. PCT/EP2013/071508, mailing date Jan. 22, 2014.
(Continued)

*Primary Examiner* — Nicole Verley
(74) *Attorney, Agent, or Firm* — thyssenkrupp North America, Inc.

(57) ABSTRACT

The invention relates to a steering column for a motor vehicle comprising a steering shaft which is mounted in a steering shaft mounting unit and is rotatable about a longitudinal axis, and comprising a support unit for connecting the steering shaft mounting unit to the body of the motor vehicle. At least one component of the steering column is composed at least partially of a fiber-reinforced composite material and the component lies in the flux of force between the steering column and the body. The component is provided with at least one pultrusion layer which has multiple fibers produced by pultrusion as reinforcing fibers, said fibers being oriented parallel to one another in the direction of the longitudinal axis.

13 Claims, 10 Drawing Sheets (51) Int. Cl.
   *B29C 70/08* (2006.01)
   *B29D 23/00* (2006.01)
   *B29K 105/08* (2006.01)

(56) References Cited

U.S. PATENT DOCUMENTS

| | | | | |
|---|---|---|---|---|
| 7,972,698 | B2* | 7/2011 | Miller | C04B 38/0032 |
| | | | | 428/408 |
| 8,419,883 | B2* | 4/2013 | Day | B29C 44/1285 |
| | | | | 156/169 |
| 9,150,237 | B2* | 10/2015 | Heitz | B62D 1/16 |
| 9,365,233 | B2* | 6/2016 | Heitz | B62D 1/16 |
| 2002/0059847 | A1 | 5/2002 | Green et al. | |
| 2003/0047929 | A1 | 3/2003 | Gianaris et al. | |
| 2008/0290641 | A1 | 11/2008 | Galehr et al. | |
| 2015/0284035 | A1* | 10/2015 | Reese | B62D 29/043 |
| | | | | 296/193.02 |
| 2016/0137218 | A1* | 5/2016 | Heitz | B29C 70/68 |
| | | | | 74/492 |

FOREIGN PATENT DOCUMENTS

| | | |
|---|---|---|
| DE | 102005034952 B3 | 2/2007 |
| DE | 10155891 B4 | 11/2009 |
| DE | 102012000633 A1 | 7/2013 |
| EP | 0091671 B1 | 5/1986 |
| EP | 0900943 A1 | 3/1999 |
| WO | 99/03716 A1 | 1/1999 |

OTHER PUBLICATIONS

English translation of International Search Report for International patent application No. PCT/EP2013/071508; mailing date Jan. 22, 2014.
German language Written Opinion of the International Search Authority for International patent application No. PCT/EP2013/071508; mailing date Jan. 22, 2014.
English translation of the Written Opinion of the International Search Authority for International patent application No. PCT/EP2013/071508; mailing date Jan. 22, 2014.
English Translation of abstract of EP 0900943 A1.
English Translation of abstract of DE 102012000633 A1.
English Translation of abstract of EP 0091671 B1.
English Translation of abstract of DE 19809264 A1.

* cited by examiner

STEERING COLUMN PRODUCED FROM FIBRE-COMPOSITE AND ON THE BASIS OF PULTRUSION, BRAIDING AND/OR WINDING TECHNOLOGY

CROSS REFERENCE TO RELATED APPLICATIONS

This application is a U.S. National Stage Entry of International Patent Application Serial Number PCT/EP2013/071508, filed Oct. 15, 2013, which claims priority to German patent application no. DE 102013001442.5 filed Jan. 29, 2013, the entire contents of both of which are incorporated herein by reference.

FIELD

The invention relates to a steering column assembly for a vehicle and to a process for producing components for such a steering column assembly.

BACKGROUND

Steering column assemblies or steering columns of the type in question are used for fitting in a motor vehicle and transmitting the torques applied by the driver to a steering wheel into a steering system of the vehicle. Furthermore, steering columns have to stand a variety of loads during use, in particular when the vehicle collides with an obstacle—the crash case.

DE 10 2005 034 952 B3 discloses for example a steering column which is adjustable in its height and its inclination. A steering spindle is mounted rotatably in an adjusting part, which is also referred to as a casing unit. The casing unit is held in a retaining part and the retaining part is mounted in a retaining clip, which can be fastened to a vehicle body. Provided for adapting the position of the steering spindle, or a steering wheel fastened thereto, is a clamping system, which can be adjusted by an adjusting lever between an open position and a closed position. In the open position of the clamping system, the casing unit can be displaced in its longitudinal direction with respect to the retaining part and at the same time the retaining part can be pivoted in its inclination with respect to the retaining clip about a pivot axis. In the closed position of the clamping system, the steering spindle is fixed with respect to the retaining clip, which is fixed to the body. Such steering columns and clamping systems are known in various configurations in the prior art.

In keeping with the prior art, the components of such steering columns are made of cast steel, aluminum or magnesium.

To favorably influence fuel consumption and to improve the driving dynamics of motor vehicles, and also to increase the range of electric-powered vehicles, there is a general desire to make such steering columns particularly lightweight and of great rigidity. For this purpose, DE 101 55 891 B4 proposes generally making the casing unit that forms the central bearing tube from a thermoplastic or a thermoplastic tube with a glass-fiber or carbon-fiber filling. However, how such a bearing tube may actually be formed is left open by the disclosure.

EP 0091671 B1 discloses a safety steering column, in which a tube part of the steering spindle is formed in one piece with a rigid steering column portion of fiber-reinforced plastic. In this case it is disclosed that the steering column is produced by a technique of winding around a core, for example of rigid polyurethane foam. However, this greatly restricts the possibilities for the design of the steering column.

DE 102 42 527 A1 discloses a steering column supporting housing consisting of a polymer composite material and having a mounting support, the steering column supporting housing and the mounting support comprising a multiplicity of fibers within a composite material.

Furthermore, DE 198 09 264 A1 discloses a fibrous structure arrangement and a process for producing a preform. In the fibrous structure arrangement, individual layers of fiber are laid one on top of the other and sewn with sewing threads, in some cases with adhesive mats inserted as intermediate layers. This arrangement includes a meltable layer, which is only activated during a forming process and, after forming into a desired three-dimensional shape, provides permanent solidification of the preform.

SUMMARY

The object of the invention is to provide a lightweight steering column with which there is a great freedom of design.

BRIEF DESCRIPTION OF THE DRAWINGS

The present disclosure is described in detail below with reference to the attached drawing figures, wherein.

DETAILED DESCRIPTION

The object is achieved by a steering column corresponding to the feature of claim 1. Advantageous developments of the invention are presented in the subclaims. In the case of a steering column for a motor vehicle, with a steering spindle mounted rotatably about a longitudinal axis in a steering spindle bearing unit and with a supporting unit that is designed to form the connection of the steering spindle bearing unit to the body of the motor vehicle, in which at least one component of the steering column is at least partially formed from a fiber-reinforced composite material, great freedom of design is obtained because it is further provided that the component lies in the flux of force of the steering column between the steering spindle and the body and that at least one pultrusion layer is provided, comprising as reinforcing fibers multiple pultrusion fibers oriented in the direction of the longitudinal axis and parallel to one another. This makes it possible to dispense with a core in the production of the fiber composite component. It is also possible to form on the outer surface regions that are concave in the circumferential direction, which cannot be accomplished, or only with great difficulty, in the case of braiding or winding processes.

Because the process for producing a steering column with a steering spindle that is mounted rotatably about its axis in a steering spindle bearing unit and with a supporting unit that is designed to connect the steering spindle bearing unit directly or indirectly to the body of the motor vehicle, at least one of the components of the steering column being formed as a fiber-composite component, comprises the following steps:

1.) pultruding supporting fibers to form a support;
2.) forming a shaped piece by braiding and/or winding reinforcing fibers around the support along predetermined paths on the surface of the support;
3.) bringing the shaped piece into a mold, either the supporting fibers and the reinforcing fibers being impregnated with a curable resin before their processing or said fibers being impregnated with a curable resin after the forming of the shaped piece, and subsequently
4.) curing the resin and forming the fiber composite component;
5.) and mounting the steering column while incorporating the fiber composite component in the steering column, the steering column can be made with relatively low weight and of great rigidity with great freedom of design.

The support formed by the pultrusion may in this case be braided and/or wound from its inner surface and/or from its outer surface for forming the shaped piece. In particular, it is also conceivable and possible to form multiple supports in the pultrusion process and to form the shaped piece with braided and/or wound layers interposed.

The invention can be applied in particular to a steering column assembly that is adjustable in its length and/or inclination. For this purpose, the supporting unit is advantageously formed by a retaining part, which can be connected to the body of the motor vehicle and receives a guiding clip, which retains the steering spindle bearing unit. Also provided in the case of an adjustable steering column is a fixing system, which can be set according to choice between an open position and a closed position. With the fixing system open, the steering spindle can be adjusted preferably by the guiding clip being pivotable in a pivot axis in the retaining part and the steering spindle bearing unit being displaceable in the guiding clip. However, the invention can also be applied to adjustable steering columns with which the adjusting functions take some other form, as are known in the prior art.

Preferably, the pultrusion fibers support at least one structure layer formed by fibers, for example a woven or knitted fabric or a braid or a wound structure. In this respect it is preferred if the structure layer is a woven fabric, since particularly good torsional rigidity can thus be achieved.

If the pultrusion fibers surround the steering spindle by at least 180° in the circumferential direction in the manner of a shell, a geometry that is advantageous for later mounting can be achieved already during the production of the component without the component created subsequently having to be cut open, as is the case with tubular blanks.

The torsional rigidity is further improved if the at least one structure layer comprises a woven fabric or a braid, with a proportion of over 50% of fibers oriented within the structure layer, these fibers being oriented at an angle between 20° and 70° in relation to the pultrusion fibers.

It is advantageous for the overall load-bearing capacity of the component if at least two structure layers are provided, the pultrusion layer being arranged between the structure layers and at least one structure layer lying on the outside and the at least one other structure layer lying on the inside.

A good compromise between mechanical properties, weight and costs is achieved by the at least one layer that is lying on the outside being produced from glass fiber and the pultrusion layer and/or the at least one layer that is lying on the inside being produced from carbon fiber.

The overall weight of the steering column is reduced if the component produced from fiber composite material bears the steering spindle indirectly or directly. For this purpose, it is further preferred that the at least one structure layer bears functional elements that are molded on, for example attached by material bonding or laminated in.

The functional elements are preferably selected from the group comprising fastening straps, guides, movement restrictors and holders for cable harnesses. In particular, the functional elements may be metal butt straps with openings, drilled holes or clearances.

In the case of the steering column according to the invention, it is particularly preferred if the component is a guiding clip for the steering spindle bearing unit. The attachment of further functional elements of the steering column is simplified if the guiding clip is open in a central region on a side that lies upward during operation. Here, for example, a steering lock may be arranged.

The present disclosure will be discussed in further detail below with reference to the attached drawing figures.

Figure 1:
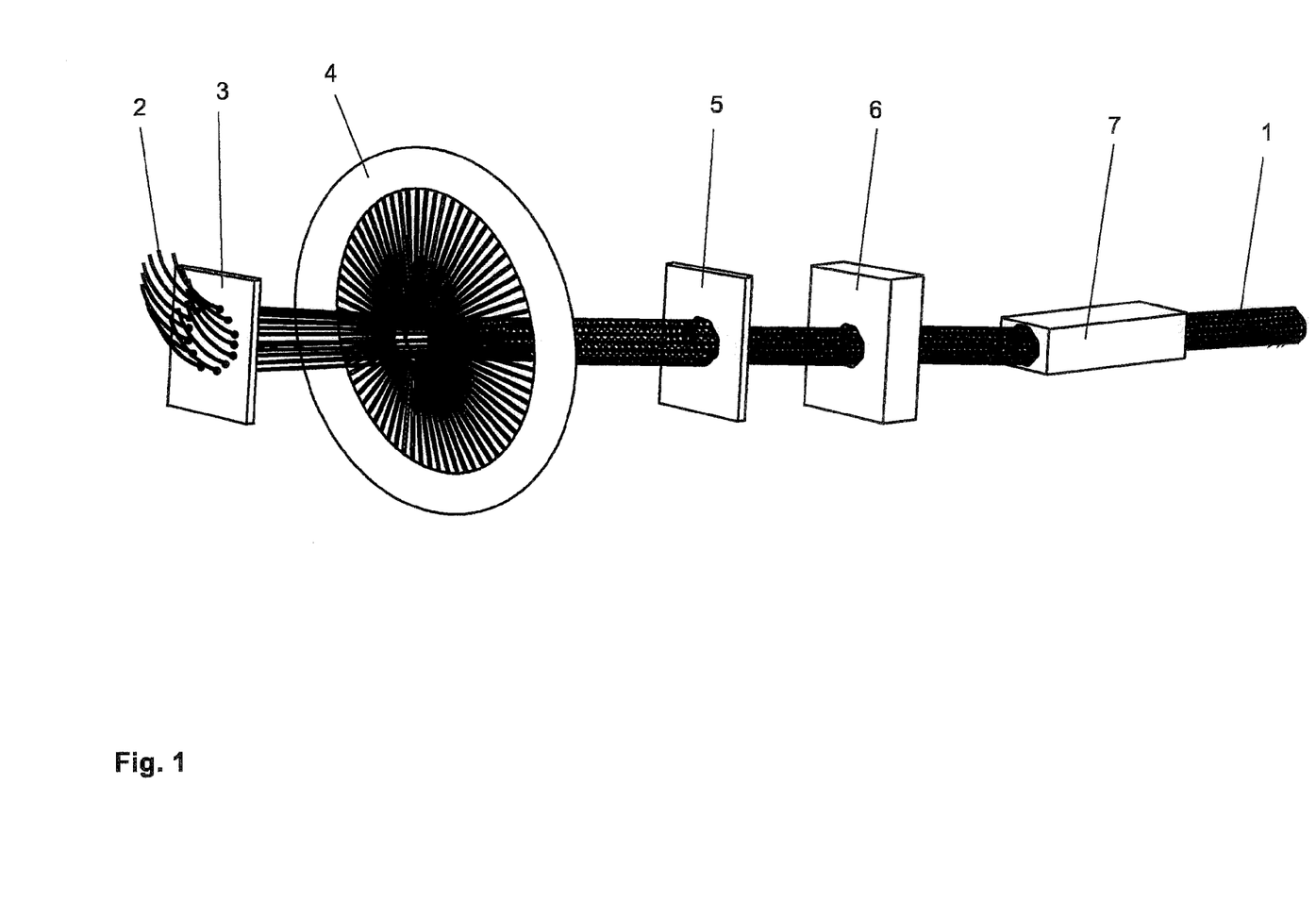
FIG. 1 is an isometric view showing an embodiment of steps of a process of the present disclosure, using pultrusion for the production of a blank from fiber composite.

FIG. 1 shows a process for producing a component from fiber composite material by pultrusion and braiding. Fiber composite materials are materials comprising reinforcing fibers bound in a matrix, whereby the material is extremely lightweight. Moreover, fiber composite materials generally have a greater specific rigidity than metallic materials. Consequently, the weights of the components can be reduced, while retaining the same properties in terms of rigidity. The rigidities of the components can also be increased according to choice or in combination, in order for example to reduce vibrations at the steering wheel induced by the road or the engine, and thus improve the properties in terms of comfort.

To increase the rigidity and strength of the component in the circumferential direction for receiving bearings or transmitting torsional moments, one or more further processes may be arranged upstream or downstream of the pultrusion process. The winding process and the braiding process are suitable for this.

The following process sequences are conceivable:
a) pultrusion→winding
b) pultrusion→braiding
c) braiding/pultrusion: braiding around a core→pultrusion
d) winding/pultrusion: winding around a core→pultrusion In all of the variants, a subsequent braiding and/or winding operation and/or also a pultrusion operation may be arranged downstream.

Subsequently, the matrix is cured in a mold.

In a way corresponding to FIG. 1, a blank 1 of fiber composite material is produced by means of pultrusion (also known as extrusion) and downstream braiding.

In the case of process sequence b) represented here, preimpregnated rovings 2 consisting of preimpregnated uncured continuous fibers arranged in parallel (not represented here) are used.

At the end of the process sequence, the rovings 2 are pulled through a first template 3 by a pulling device (likewise not represented here) and brought into the desired profiled shape. The pulling force applied by the pulling device is in this case so great that the arrangement of the rovings 2, and consequently the profiled shape, is also retained in the other steps of the process.

After the first template 3, the rovings 2 that have been brought into shape are passed through a braiding head 4. By arranging the braiding process downstream, the pultruded profile can be used as a structure or core and be reinforced with one or more wound or braided layers. The same result as in the case of the braiding process can also be achieved by winding. By contrast, in the case of winding, the rovings are not arranged in a crosswise directional structure but are wound around. In this case, multiple rovings may be wound in a correspondingly offset manner, so that virtually the same arrangement of the rovings is produced.

In order to refine the shaping, after the braiding head 4 the entire braid is passed through a second template 5 and a third template 6. Following that, the braid is pulled through a heated curing zone 7. In the curing zone 7, the synthetic resin solidifies under the effect of heat and forms a blank 1. For this, the resin is mixed with a catalyst. This curing may take place by introducing an increased temperature and/or by introducing ultrasound and/or by introducing ultraviolet light.

With the core or mold core 11, the molded part can be compacted in the mold.

The mold core 11 advantageously extends over the entire distance from the beginning of pultrusion or of the braiding or winding process to the curing of the curable resin. This makes it possible to arrange a braid or a fiber winding around the core within the support formed by the pultrusion.

Figure 2:
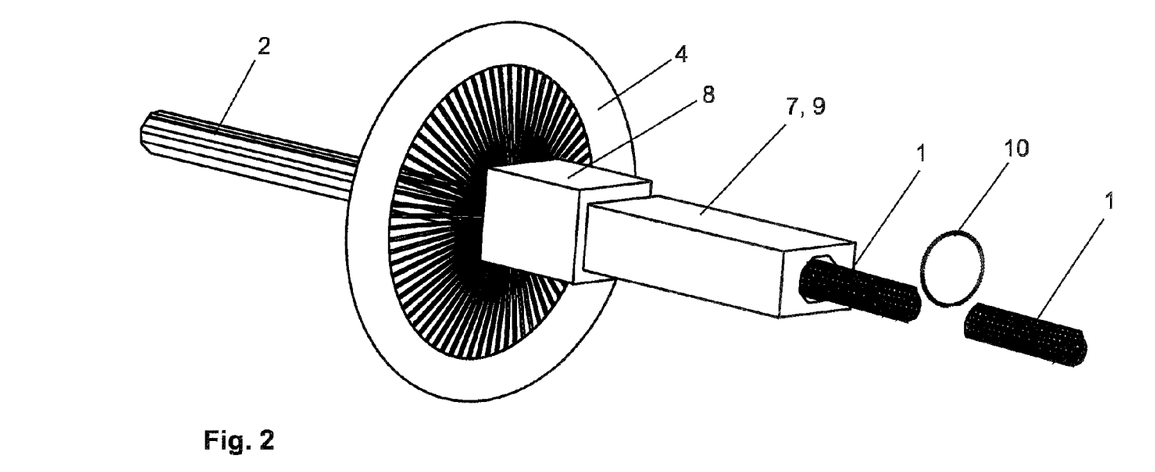
FIG. 2 is an alternate embodiment of steps of a process of the present disclosure, using the technology as shown in FIG. 1.

Another embodiment of process sequence b) is represented in FIG. 2.

Here, rovings 2 are brought into the profiled shape by being pulled through a first template (not represented here). After that, as in the previous embodiment, a second layer of rovings 2 is braided onto the arrangement of the rovings 2 by being introduced into the braiding head 4. After the braiding head 4, the braid runs through an impregnating bath 8, in which it is impregnated with a liquid synthetic resin. Subsequently, in a heated curing zone 7, which at the same time forms a mold 9, the synthetic resin is cured. The mold 9 provided ensures the profiled shape and can perform further shaping operations. After the curing, the blank 1 is cut to size or sawn by a cutting device 10.

As an alternative to the impregnation of the rovings 2 in an impregnating bath, it is also conceivable and possible to introduce the curable resin directly into the mold, preferably with pressure, and thereby impregnate the fibers with the resin.

Figure 3:
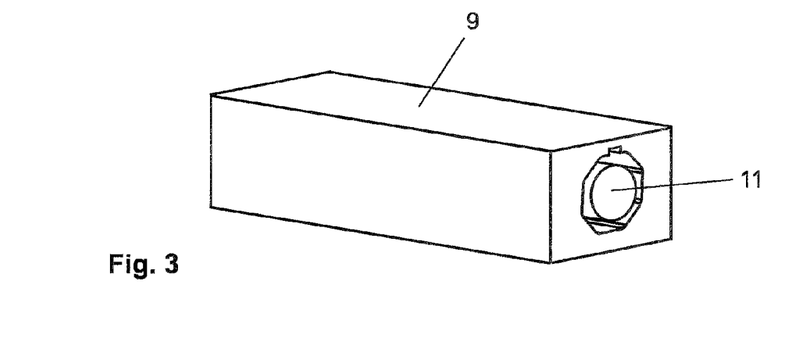
FIG. 3 is an isometric view of an embodiment of a mold of the present disclosure.

FIG. 3 shows a mold 9 with a mold core 11. Mold cores 11 serve for the shaping of the blank 7 and may be used on their own or in addition to templates. Reusable mold cores 11 are in this case preferably produced from aluminum or steel. The mold core may protrude from the mold on one side and reach up to the braiding head 4 or up to the first template 3. This arrangement is particularly advantageous, or even necessary, in the case of the aforementioned process sequences c) and d). Known in principle are mold cores 11 of structural foam, which can remain in the fiber composite component, or soluble mold cores 11, which are washed out after the consolidation of the fiber composite. However, such cores are not to be preferred.

Figure 4:
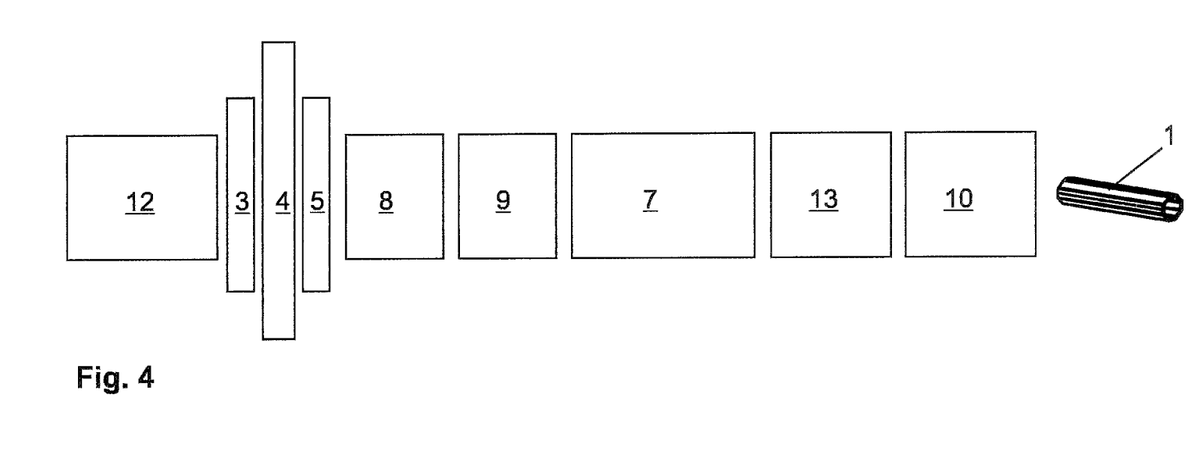
FIG. 4 is a schematic block diagram showing an embodiment of steps of a process for producing parts of a steering column, as disclosed herein.

A schematic representation of process sequence b) is reproduced in FIG. 4. In a first step, the rovings 2 are unwound by a roller unwinder 12 and tensioned. After that, they run through the first template 3, before a braid is applied by the braiding head 4 and the entire profile is passed through the second template 5. Subsequently, the rovings 2 run through the impregnating bath 8, the mold 9 and the curing zone 7. The resin received in the impregnating bath 8 is cured in the curing zone 7. Downstream of the curing zone 7 there is a pulling device 13, which has not been shown in the previous FIGS. 1 and 2. The rovings 2 are tensioned and pulled by this pulling device 13 from left to right through the individual components of the construction. In the last step of the process, the cutting device 10 provides that the blank 1 is cut to the correct length.

Figure 5:
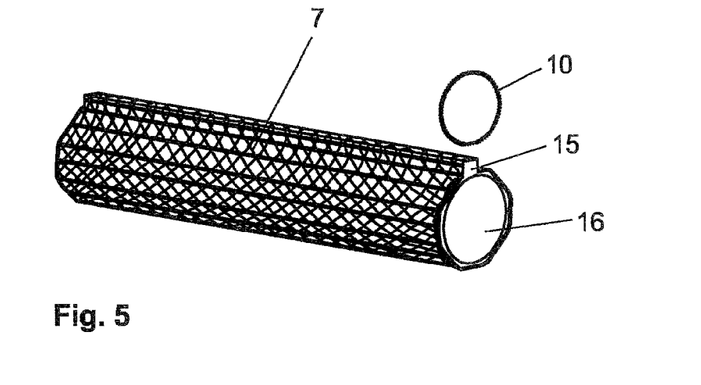
FIG. 5 is an isometric view of an embodiment of a blank of a casing tube that has been cut off from a continuous blank, as disclosed herein.
Figure 6:
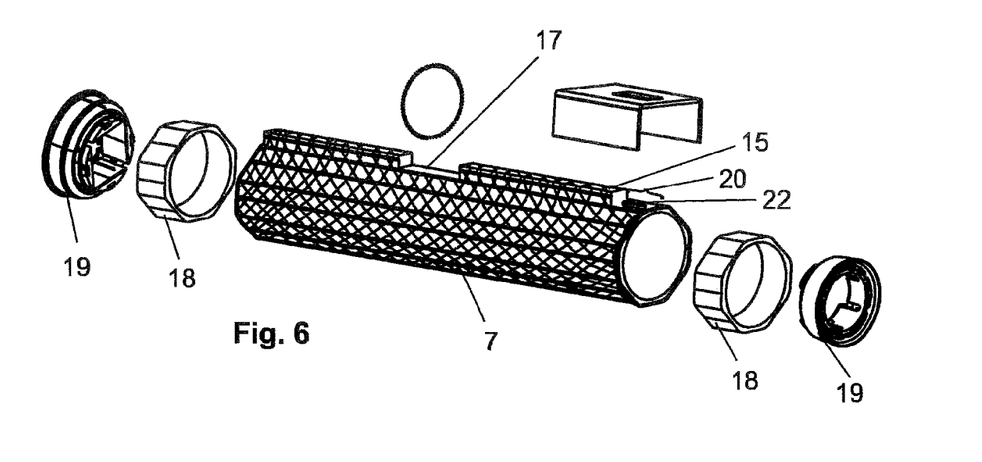
FIG. 6 is an isometric exploded view of the blank from FIG. 5 that has been further processed into a casing tube.
Figure 7:
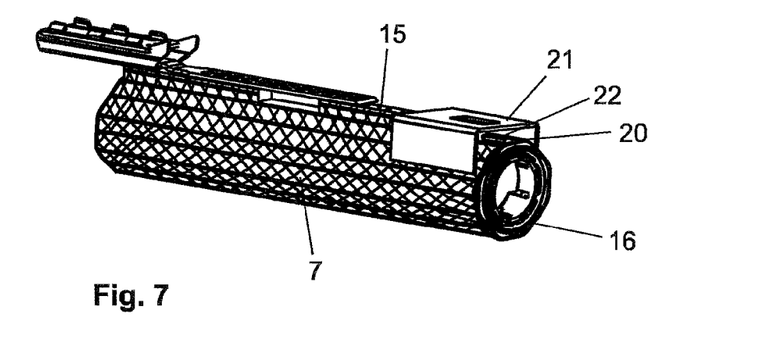
FIG. 7 is an isometric view of the blank of FIGS. 5 and 6 that is completed by a holder for an immobilizer, as disclosed herein.

In further steps (FIGS. 5-7), the blank 1 is completed to form a casing tube 14 of a steering column according to the invention. As indicated in FIG. 5, for this purpose a first milled relief with an opening is introduced into a guiding ridge 15 of the blank 7 at an end face 16. Furthermore (FIG. 6), a second milled relief 17 is introduced at the guiding ridge 15 and, acting together with further elements, may serve as a linear stop of the steering column according to the invention. Furthermore, on both sides of the blank 1, two bearing receptacles 18 and corresponding bearings 19 for bearing a steering spindle are attached to the blank 1. In FIG. 7, the preassembled casing tube 14 is shown. To finish it off, a holder 21 for an immobilizer (not shown here) is provided on the first milled relief 20 of the guiding ridge 15 at the end face 16 of the blank 1, so that the immobilizer can engage through the opening 22 into a steering shaft that is not shown here.

Figure 8:
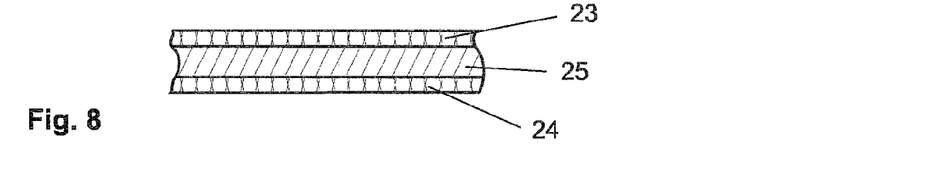
FIG. 8 is a partial cross-section view of a preferred layered construction of a blank of the present disclosure.

In FIG. 8, a profile of a preferred layered construction of a blank 1 is represented. The profile shows the cured synthetic resin with the rovings 2 embedded therein in three layers. Hatchings should in this case not be regarded as rovings 2.

The inner layer 23 consists of pultrusion rovings, which, in the case of components that are predominantly subjected to tensile or flexural loading, such as for example the casing tube of a steering column, lie in the component appropriately for the flux of force in the axial direction.

The outer layers 24, 25 of the layered construction consist of arrangements created by braiding or winding technology, with an angle of approximately +/−45°. The fiber layers oriented at ±45° allow tensile stresses that are caused by transverse forces to be absorbed.

All of the fibers of the layered construction may consist of glass, aramid or carbon. Other materials may also serve for forming the fibers. With preference, the outer layers 24, 25 are formed with glass fibers and the inner layers 23, which are pultruded layers, are fog ned with carbon fibers.

In this case, glass fibers for the outer layers 24, 25, the regions in which contact with other components, in particular metallic components, of the steering column is intended, are used to improve the corrosion resistance.

Figure 9:
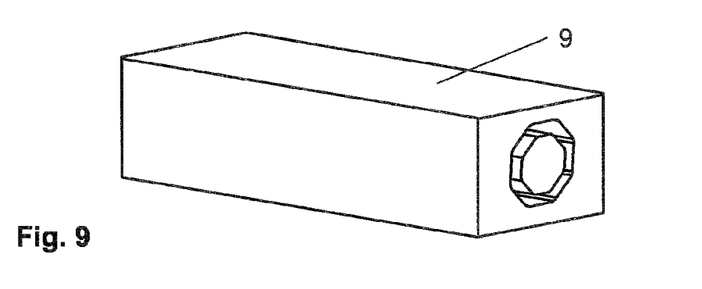
FIG. 9 is an isometric view of an alternate embodiment of the mold of FIG. 3.
Figure 10:
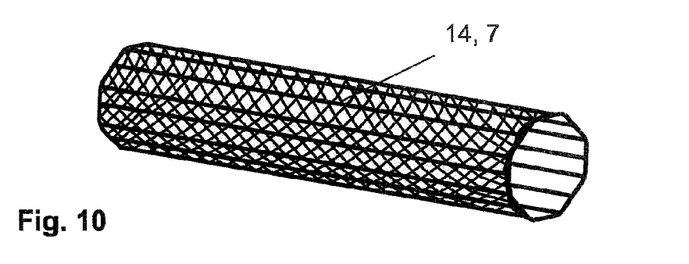
FIG. 10 is an isometric view of an alternate embodiment of the blank of a casing of FIG. 5.
Figure 11:
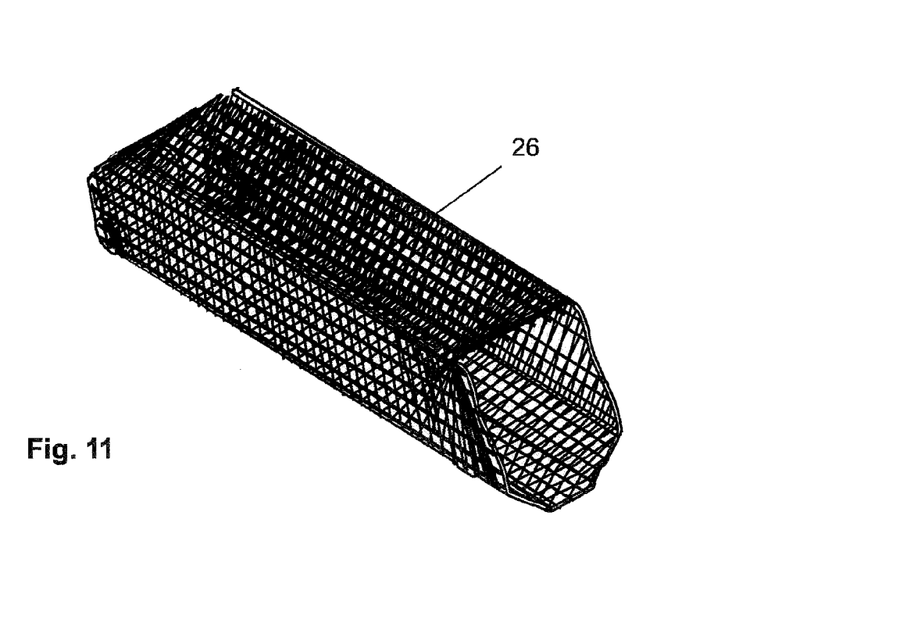
FIG. 11 is an isometric view of an alternate embodiment of a blank produced by pultrusion of a guiding clip of a steering column, as disclosed herein.
Figure 12:
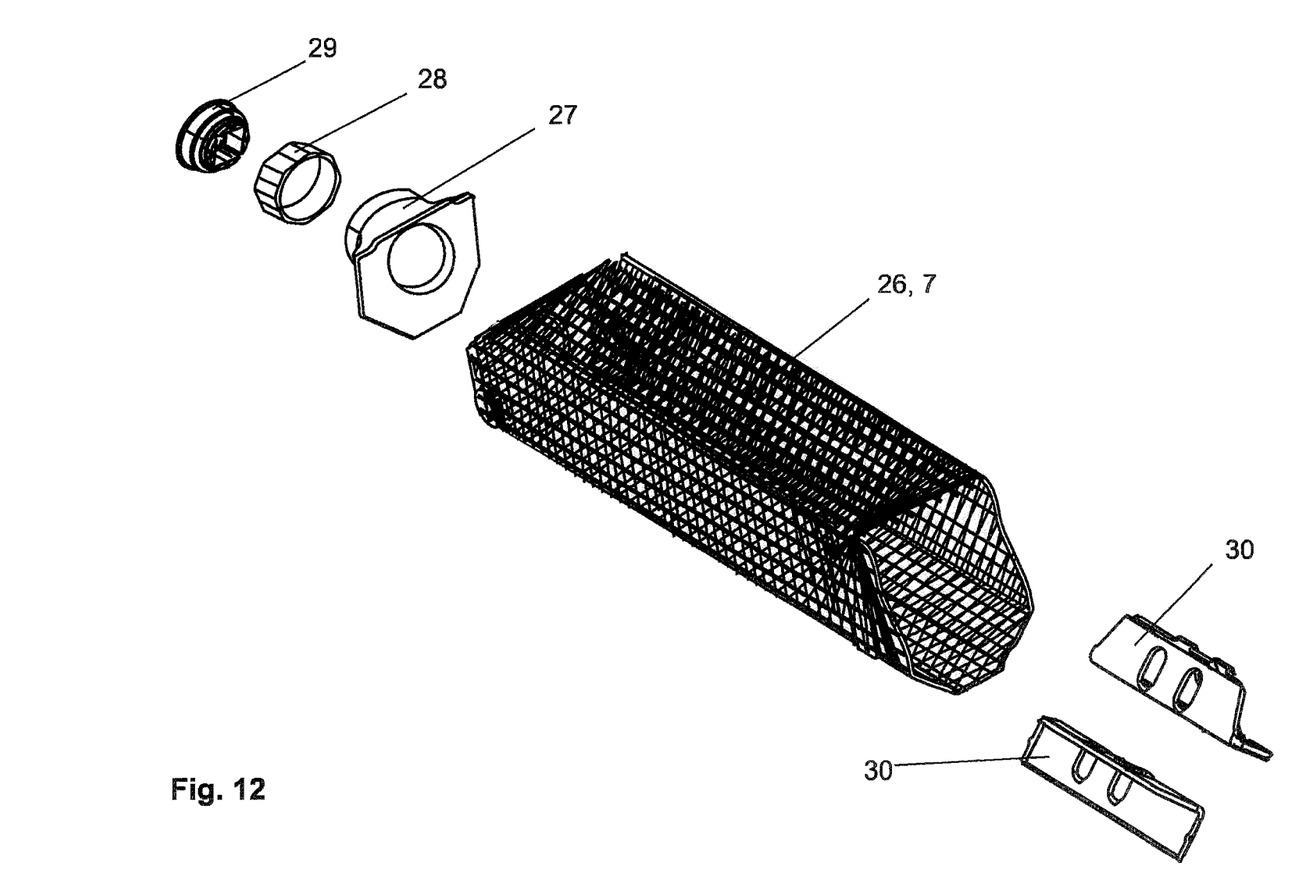
FIG. 12 is an isometric exploded view of the blank of FIG. 11 completed by an end piece, a bearing receptacle, a bearing and wedge elements, as disclosed herein.

Illustrated in FIGS. 9 and 10 are a mold 9 and a blank 1 of an alternative type of casing tube 14, in which no guiding ridge is provided and the casing tube 14 is formed in a multi-cornered, polygonal shape. One advantage of the process according to the invention is that the configuration of the profile can be freely chosen, and consequently the shaping of the casing tube is not restricted.

Figure 13:
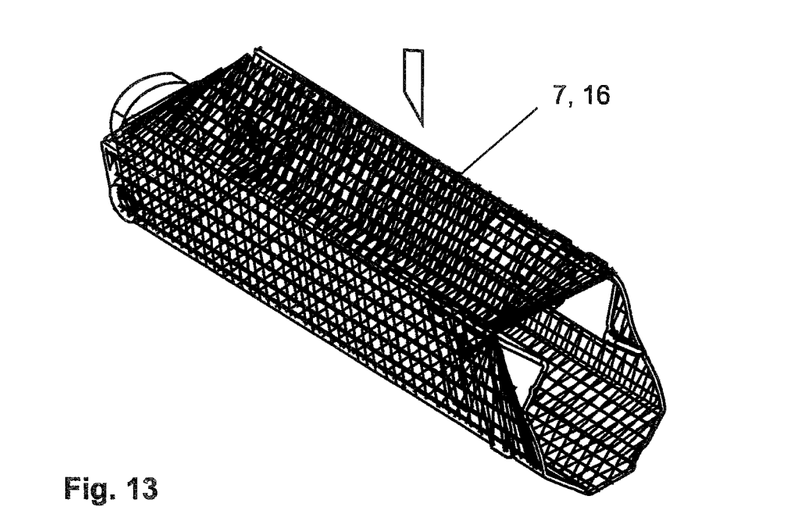
FIG. 13 is an isometric view of an embodiment of a preassembled module assembled from the individual parts from FIG. 12.
Figure 14:
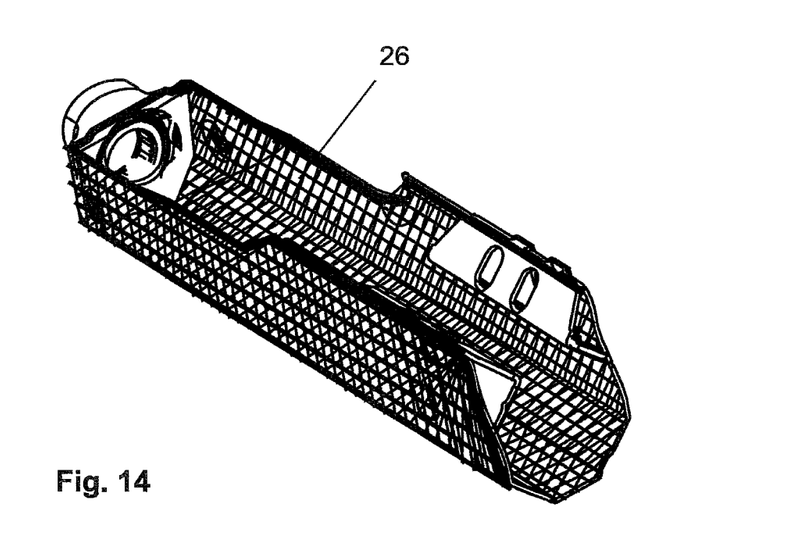
FIG. 14 is an isometric view of an embodiment of the preassembled module of FIG. 13 having a desired opening cut in the guiding clip.
Figure 15:
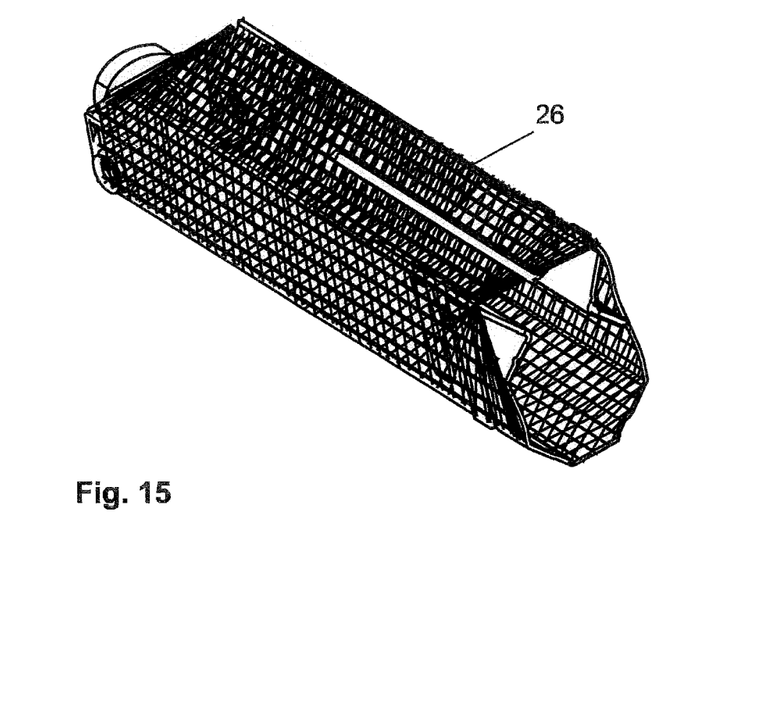
FIG. 15 is an isometric view of an alternate embodiment of a guiding clip of the steering column, as disclosed herein.
Figure 16:
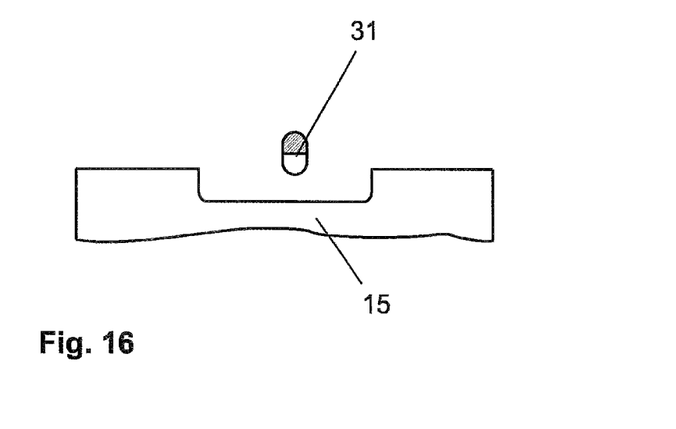
FIG. 16 is a plan view of the engagement of a clamping bolt in a guiding ridge, as disclosed herein.

Furthermore, in the case of the process according to the invention, the cross section of a blank can be chosen within a wide range. Both closed and open components can be produced, for example a guiding clip. FIGS. 11 to 14 illustrate the representation of a guiding clip 26. As represented in FIGS. 1, 2 and 3, a corresponding blank 1 is produced in a combination of pultrusion and braiding and winding technology. Subsequently, in a way corresponding to FIG. 12, an end piece 27, a bearing receptacle 28 and a bearing 29 for the steering shaft are attached, and also wedge elements 30 for the clamping system of the steering column are inserted in the blank 1. In FIG. 13, a module preassembled in this way is represented. Subsequently, the circumferentially closed blank 1 is cut open in a cutting operation, in order to obtain the desired opening in the swiveling lever 26. In FIG. 15, an alternative embodiment of the guiding clip 26 with the corresponding cutouts is represented. FIG. 16 shows the engagement of a clamping bolt 31 in the guiding ridge 15, which in the open position of the clamping system limits the linear adjustment by the stops.

To form the steering column, the individual components, of which at least one component has been produced by the technology described, are assembled.

Figure 17:
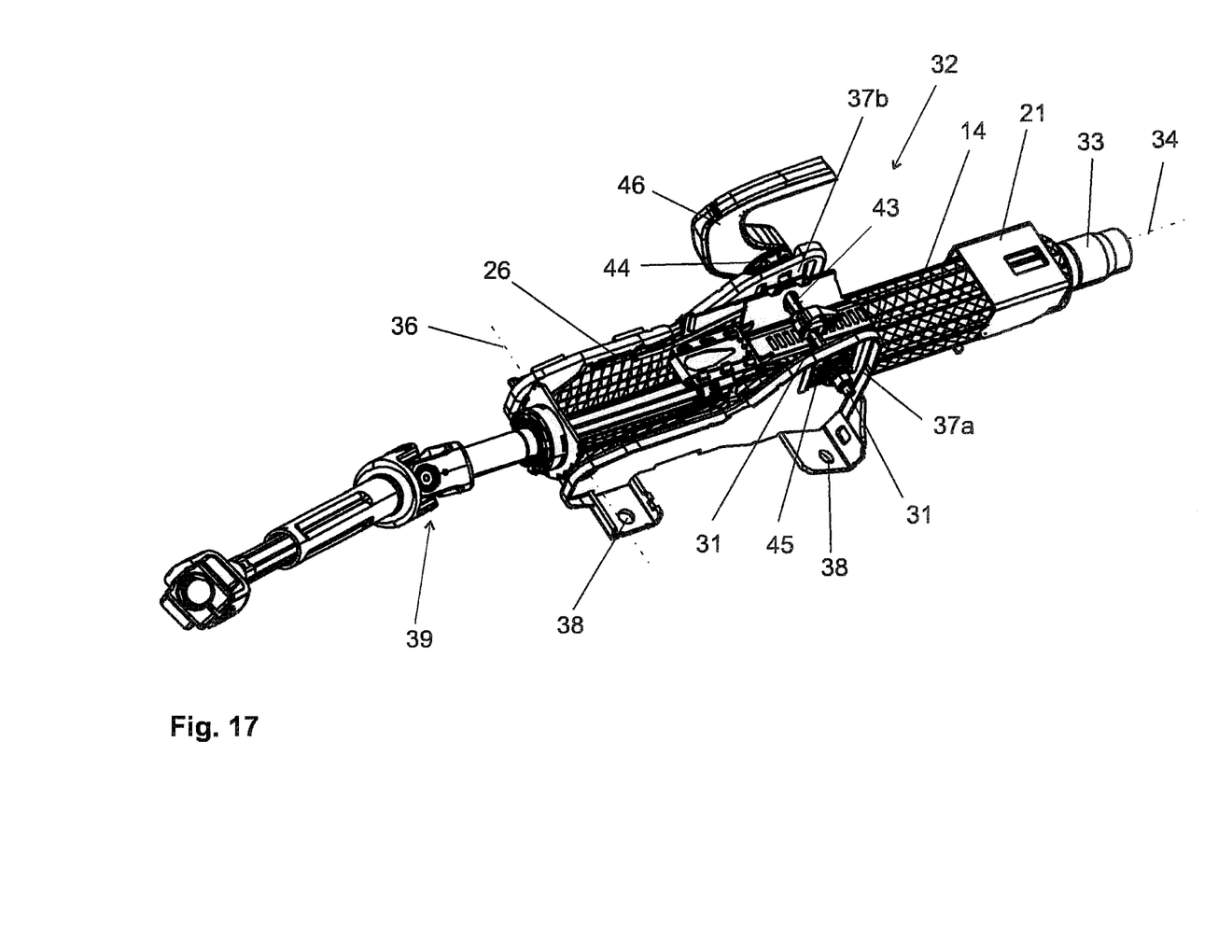
FIGS. 17 and 18 are isometric views of embodiments of a fully assembled steering column with the casing tube and the guiding clip, as disclosed herein.
Figure 18:
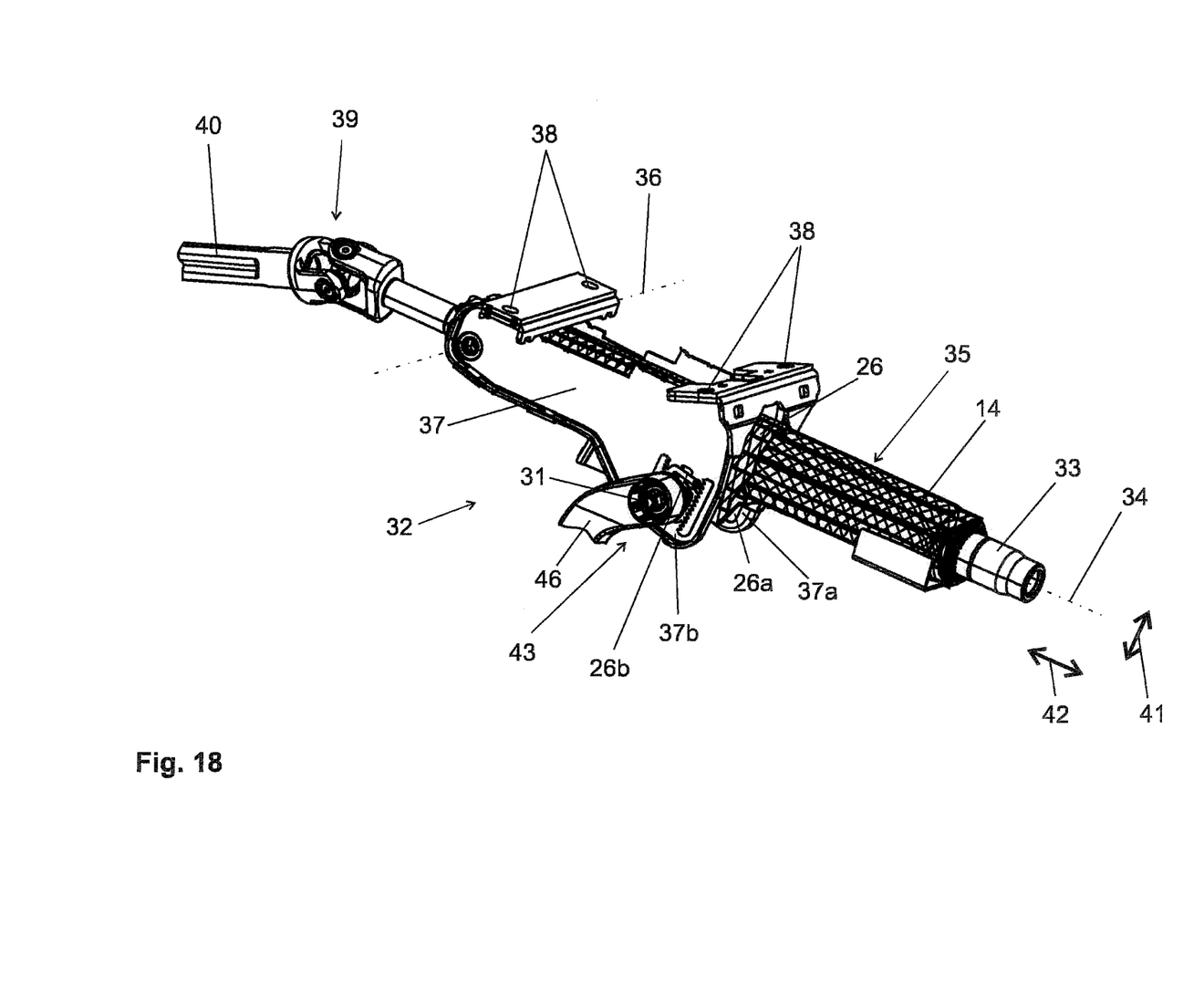

FIGS. 17 and 18 illustrate a steering column 32 according to the invention, which comprises a steering spindle 33, which is mounted rotatably about its axis of rotation 34 in a steering spindle bearing unit 35, having a casing tube 14. The casing tube 14 is guided in a guiding clip 26 displaceably along the longitudinal axis 34 of the steering spindle 33. The guiding clip 26 is mounted pivotably about a pivot axis 36 in a retaining part 37. The retaining part 37 may be fastened to the body (not represented) at fastening points 38. The turning movement introduced into the steering spindle 33 by a driver by way of a steering wheel (not represented) is introduced into the steering gear (not represented) by way of a cardan joint 39 and further steering shaft parts 40. To increase the comfort of the driver, the steering column 32 can be adjusted in its height in the adjusting direction 41 and in its length in the adjusting direction 42. Provided for this purpose is a fixing mechanism 43, which comprises a clamping apparatus known in the prior art. The clamping apparatus has the clamping bolt 32, a cam mechanism 44, a counterpressure bearing 45 and a clamping lever 46. By turning the clamping lever 46, the two cams of the cam mechanism 44 are turned with respect to one another and the side pieces 37a, 37b are drawn together, whereby frictional bracing of the side pieces 37a, 37b of the retaining part 37 with the side faces of the guiding clip 26, and in turn with side faces of the casing tube 14, takes place.

The clamping bolt 31 passes through slots in the side pieces 37a, 37b of the retaining part 37 and holes in the side faces 26a, 26b of the guiding clip 26. The cam mechanism 44 is arranged on one end of the clamping bolt and the pressure bearing 45 is arranged on the other end of the clamping bolt 31. The side pieces 37a, 37b and also the side faces 26a, 26b as well as the casing tube 14 are arranged between the cam mechanism 44 and the pressure bearing 45.

By turning the clamping lever 46, the fixing system 43 can be switched over according to choice into an open position or a closed position. In the open position, the steering spindle 33, or the steering wheel fastened thereto (not represented in the figures), can be adjusted in its position, in particular be displaced in the longitudinal direction 42 and in the direction of its height or inclination 41. In the closed position of the fixing system 43, the steering column 32 is fixed in its position.

LIST OF DESIGNATIONS

1. Blank
2. Roving
3. Template
4. Braiding head
5. Template
6. Template
7. Curing zone
8. Impregnating bath
9. Mold
10. Cutting device
11. Mold core
12. Roller unwinder
13. Pulling device
14. Casing tube
15. Guiding ridge
16. End face
17. Milled relief
18. Bearing receptacles
19. Bearing
20. Milled relief
21. Holder
22. Opening
23. Inner layer
24. Outer layer
25. Outer layer
26. Guiding clip
27. End piece
28. Bearing receptacle
29. Bearing
30. Wedge element
31. Clamping bolt
32. Steering column
33. Steering spindle
34. Axis of rotation
35. Steering spindle bearing unit
36. Pivot axis
37. Retaining part
38. Fastening points
39. Cardan joint
40. Steering shaft part
41. Adjusting direction
42. Adjusting direction
43. Fixing mechanism
44. Cam mechanism
45. Counterpressure bearing
46. Clamping lever

The invention claimed is:

1. A steering column for a motor vehicle with a steering spindle mounted rotatably about a longitudinal axis in a steering spindle bearing unit and with a supporting unit that is designed to form the connection of the steering spindle bearing unit to a body of the motor vehicle, at least one component of the steering column being at least partially formed from a fiber-reinforced composite material, characterized in that the component lies in the flux of force of the steering column between the steering spindle and the body and in that at least one pultrusion layer is provided, comprising as reinforcing fibers multiple pultrusion fibers oriented in the direction of the longitudinal axis and parallel to one another.

2. The steering column of claim 1, characterized in that the pultrusion fibers support at least one structure layer formed by fibers.

3. The steering column of claim 2, characterized in that the structure layer is a woven fabric.

4. The steering column of claim 2, wherein the at least one structure layer comprises a woven fabric or a braid, with a proportion of over 50% of fibers oriented within the structure layer, these fibers being oriented at an angle between 20° and 70° in relation to the pultrusion fibers.

5. The steering column of claim 2, wherein the at least one structure layer bears functional elements that are molded on.

6. The steering column of claim 5, wherein the functional elements are selected from the group comprising fastening straps, guides, movement restrictors and holders for cable harnesses.

7. The steering column of claim 5, wherein the functional elements are metal butt straps with openings, drilled holes or clearances.

8. The steering column of claim 1, wherein the pultrusion fibers surround the steering spindle by at least 180° in the circumferential direction in the manner of a shell.

9. The steering column of claim 8, wherein at least two structure layers are provided, the pultrusion layer being arranged between the structure layers and at least one structure layer lying on the outside and the at least one other structure layer lying on the inside.

10. The steering column of claim 9, wherein the at least one layer that is lying on the outside is produced from glass fibers and the pultrusion layer and/or the at least one layer that is lying on the inside is produced from carbon fibers.

11. The steering column of claim 1, wherein the component bears the steering spindle indirectly or directly.

12. The steering column of claim 1, wherein the component is a guiding clip for a steering spindle bearing unit.

13. The steering column of claim 12, wherein the guiding clip is open in a central region on a side that lies upward during operation.

* * * * *